J. CHWEIBACK.
HAND TRUCK.
APPLICATION FILED FEB. 8, 1912.

1,086,026.

Patented Feb. 3, 1914.

2 SHEETS—SHEET 1.

WITNESSES
G. M. Spring.
J. R. Kelly

INVENTOR
Joseph Chweiback,
by Richard _____
his Attorney

COLUMBIA PLANOGRAPH CO., WASHINGTON, D. C.

J. CHWEIBACK.
HAND TRUCK.
APPLICATION FILED FEB. 8, 1912.
1,086,026.
Patented Feb. 3, 1914.
2 SHEETS—SHEET 2.
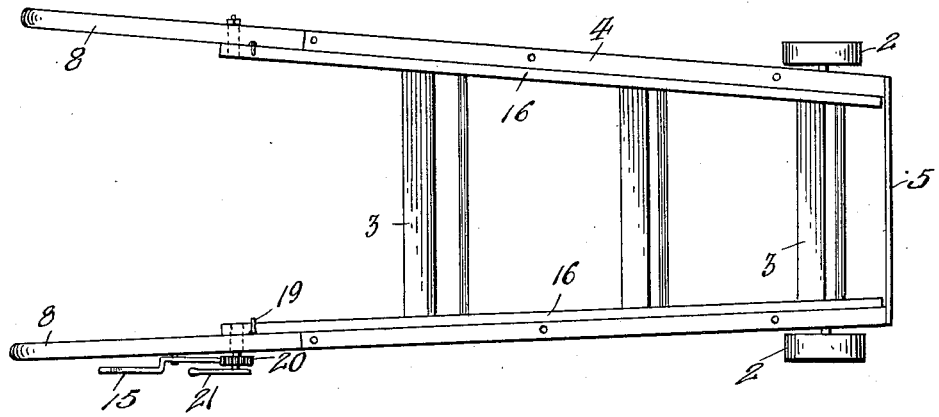
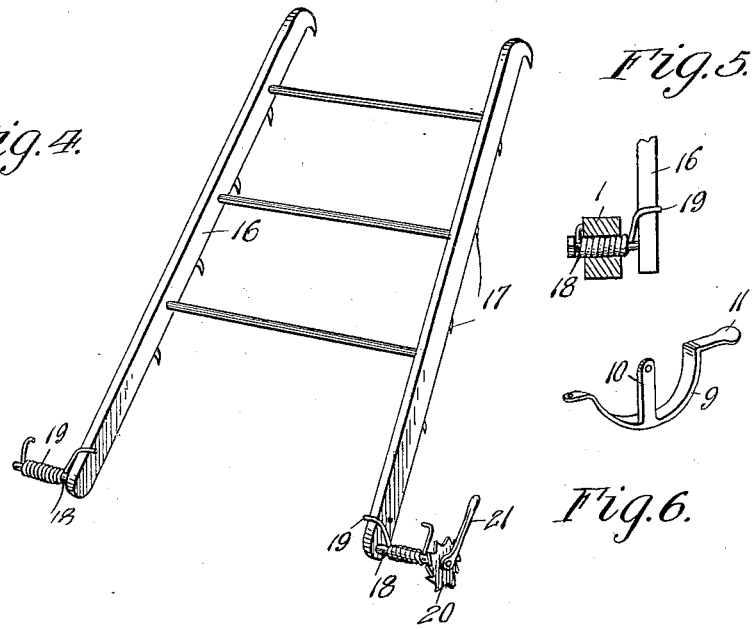
WITNESSES
G. M. Spring.
J. R. Kelly
INVENTOR
Joseph Chweiback,
Richard A. Owen
his Attorney

UNITED STATES PATENT OFFICE.

JOSEPH CHWEIBACK, OF KIMBERLEY, CAPE COLONY, SOUTH AFRICA.

HAND-TRUCK.

1,086,026.  Specification of Letters Patent.  Patented Feb. 3, 1914.

Application filed February 8, 1912. Serial No. 676,476.

*To all whom it may concern:*

Be it known that I, JOSEPH CHWEIBACK, a citizen and subject of Great Britain, and a resident of Kimberley, in the district of Kimberley, Cape Colony, South Africa, have invented new and useful Improvements in Hand-Trucks, of which the following is a specification.

My invention relates to the class of hand trucks.

An object of my invention is to provide a truck wherein is embodied means for facilitating the loading of heavy boxes or the like thereon and one with which these heavy boxes or the like may be loaded by a single man without the aid of others.

Another object of my invention is to provide means whereby a heavy box or the like may be easily loaded upon a truck, said truck embodying means whereby said box may be held upon said truck thereby preventing the same from falling off.

Another object of my invention is to provide a truck of this nature which is as simple in construction as is feasible and an attachment therefor which is easily operated, simple in construction and comparatively easy to manufacture.

With the above and other objects in view my invention relates to such details of construction and in the arrangement and combination of parts as will be hereinafter fully described and specifically pointed out in the appended claims.

In describing my invention in detail, reference will be had to the accompanying drawings wherein like characters denote like or corresponding parts throughout the several views, and in which:—

Figure 1:
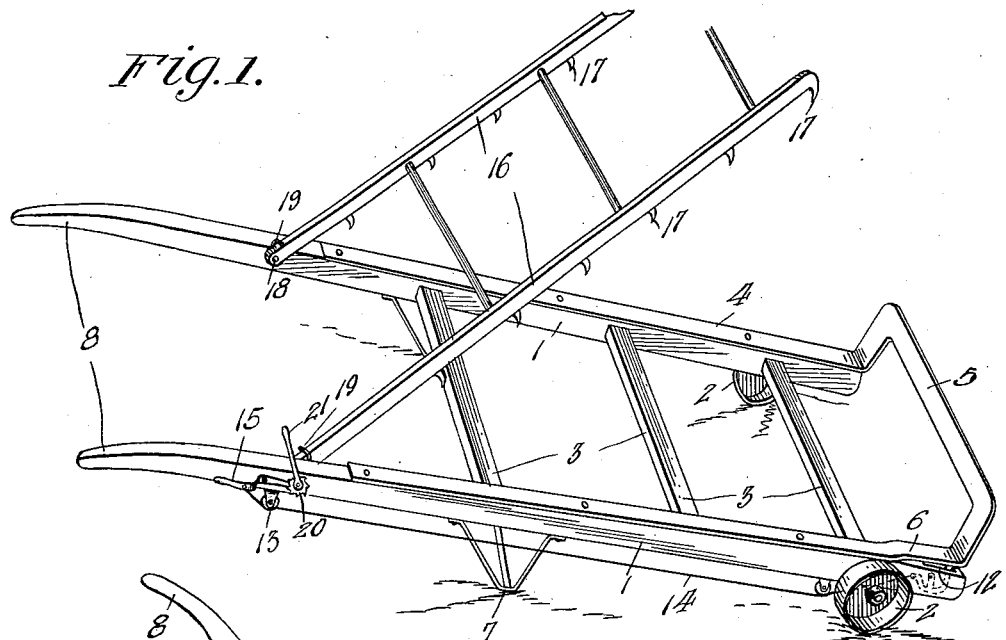
Figure 2:
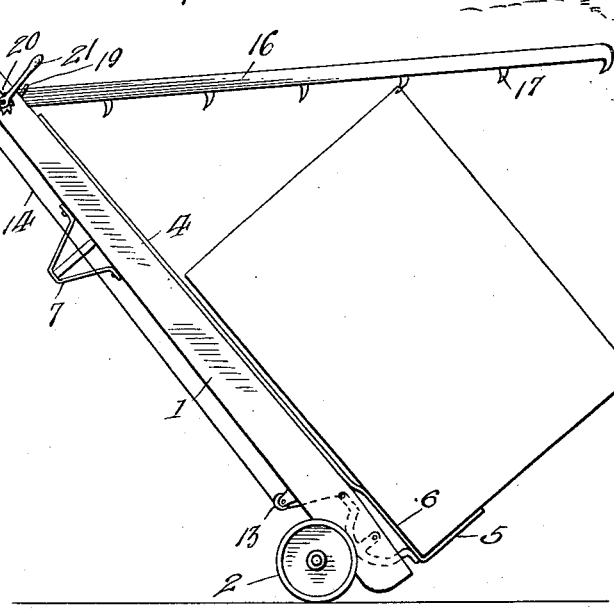

Figure 1 is a perspective view of my improved truck. Fig. 2 is a side view of my improved truck showing a box thereon. Fig. 3 is a top plan view of my truck. Fig. 4 is a perspective view of means whereby a box may be held upon said truck. Fig. 5 is a detailed view. Fig. 6 is a perspective view of an element which is used.

In the drawings which accompany this application and which fully illustrate the preferred type of my invention the numeral 1 designates the arms of an ordinary truck, the said arms being supported by the wheels 2 and connected intermediate their ends by means of the braces 3, the arms 1 are provided with the metallic member 4 which is bent upwardly intermediate its ends as shown at 5, whereby the same may be inserted beneath a box when it is desired to load the same upon the truck. The member 4 is also bent as shown at 6 which serves a purpose that will be hereinafter fully described. The arms 1 are provided further with the feet portions 7 whereby the same may be rested upon the ground. One end of each of the arms 1 form handle portions as shown at 8 whereby the truck may be easily operated. Pivoted within a recess in one of the arms 1 near the end is the member 9 which has the extension 10 formed thereon and preferably intermediate its ends thereof. The member 9 is pivoted to the arm 1 through the medium of the extension 10. One end of the member 9 as shown at 11 is adapted to extend through an opening 12 in one of the arms 1, and engage the metallic member 4 near the bent portion 6, whereby when a box or the like is carried upon said truck and on said metallic member the member will tend to force the end 11 of the member 9 downwardly for a purpose that will be described. Disposed upon one of the arms 1 are the pulleys 13 which engage a cable 14, which cable is connected to one end of the member 9. The cable 14 is further connected to a lever 15 at a point intermediate its ends, which is pivoted to one of the arms 1. It will be seen from the foregoing that when a box or the like is disposed upon the truck the bent portion 6 of the metallic member 4 will be pushed downwardly thereby operating the member 9 and further operating the lever 15, for a purpose as will be described.

Pivoted to each of the arms 1 are the members 16, which have the lugs 17 formed thereon for a purpose that will be described. The lugs 17 are sharpened so as to firmly grip the box or the like and a series of them are formed on each of the members 16 so that boxes or the like of various sizes may be securely gripped. Carried by each of the members 16 are the pins 18, which extend through the arms 1 and form a means for pivotally connecting the members 16 to the arms 1. Disposed upon the pins 18 and engaging the members 16 and the arms 1 are the coil springs 19 which tend to force the members 16 into engagement with a box or the like which is held upon the truck and is clearly shown in Fig. 2. One of the pins 18 is provided with a ratchet wheel 20 which is engaged by the lever 15, whereby the said lever will control the movement of the same and prevent the members 16 from moving downwardly when a box or the like is not upon the truck. One of the pins 18 is further provided with a hand lever 21 whereby the members 16 may be operated when desired. In the operation of my device the bent portion 5 of the metallic members 4 is inserted under the corner of a box or the like and engages the lower end, the side of the box contacting with the bent portion 6 of the member 4. When a slight downward pressure is imparted to the handles 8 of the members 1, a part of the weight of the box is transferred upon the bent portion 6, this presses the bent portion 6 inwardly and into engagement with the shoulder 11 of the member 9 and also presses it inwardly and downwardly, thus actuating the lever 15 through the medium of a cable 14 and releasing the same from engagement with the ratchet 20. After the lever 15 has been pushed out of engagement with the ratchet wheel 20, the members 16 are forced downwardly by means of the coil springs 19, and the lugs 17 engaging the top of a box whereby the same may be securely held upon the truck when the ends of the arms are pulled downwardly preparatory to the moving of the truck. It will be readily seen that a heavy article may be loaded upon the truck by a single man thereby doing away with a great deal of expense in employing several persons to load boxes upon trucks.

It is thought from the foregoing that the advantages and novel features of my device will be appreciated.

I desire it to be understood that I may make slight changes in the construction and in the arrangement and combination of the several parts without departing from the spirit of my invention, provided such changes fall within the scope of the appended claims.

Having thus fully described my invention, what I claim as new and desire to secure by Letters Patent, is:—

1. In a truck; a truck body consisting of two arms, wheels mounted in bearings upon the lower ends of said arms, handles formed upon the upper ends of said arms, a substantially U-shaped metallic member attached to said arms, the connected end of said U-shaped member being bent substantially at right angles to the legs, two members pivotally connected to said arms through the mediums of pins, braces connecting said members, a series of sharpened lugs upon each of said members, a ratchet upon one of said pins, a portion of said U-shaped member adjacent the connected portion being bent slightly outwardly, a member provided with a shoulder pivotally mounted in a recess in one of said arms, a lever pivotally mounted upon one of said arms, pulleys carried by one of said arms, a cord connected to said lever passing over said pulleys and connected to one end of said member which is pivoted in the recess in said arm, said lever engaging said ratchet and preventing the movement of said pivoted members, said bent portion, said pivoted member and said cord forming means for moving said lever out of engagement with said ratchet thereby permitting movement of said pivoted members.

2. In a truck; a truck body consisting of two arms, wheels mounted in bearings upon the lower ends of said arms, handles formed upon the upper ends of said arms, a substantially U-shaped metallic member attached to said arms, the connected end of said U-shaped member being bent substantially at right angles to the legs, two members pivotally connected to said arms through the mediums of pins, braces connecting said members, a series of sharpened lugs upon each of said members, a ratchet upon one of said pins, a portion of said U-shaped member adjacent the connected portion being bent slightly outwardly, a member provided with a shoulder pivotally mounted in a recess in one of said arms, a lever pivotally mounted upon one of said arms, pulleys carried by one of said arms, a cord connected to said lever passing over said pulleys and connected to one end of said member which is pivoted in the recess in said arm, said lever engaging said ratchet and preventing the movement of said pivoted members, said bent portion, said pivoted member and said cord forming means for moving said lever out of engagement with said ratchet thereby permitting movement of said pivoted members, a coil spring disposed about each of said pins and a lever mounted upon the outer end of one of said pins, said lever forming means for manually actuating said pivoted members.

JOSEPH CHWEIBACK.

Witnesses:
ALFRED E. ERLANK,
IVAN C. SILBERBAUER.